United States Patent Office 3,119,424
Patented Jan. 28, 1964

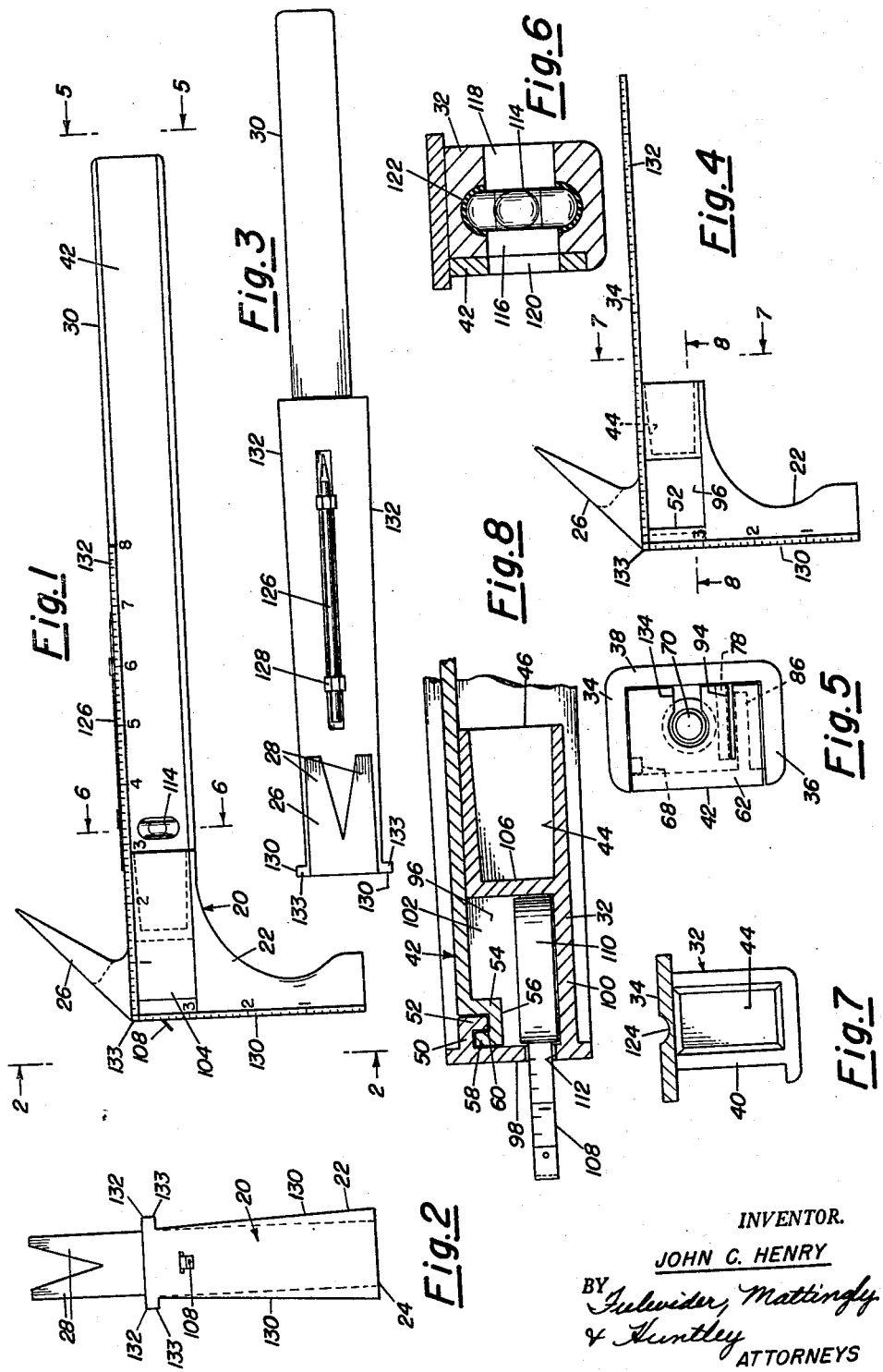

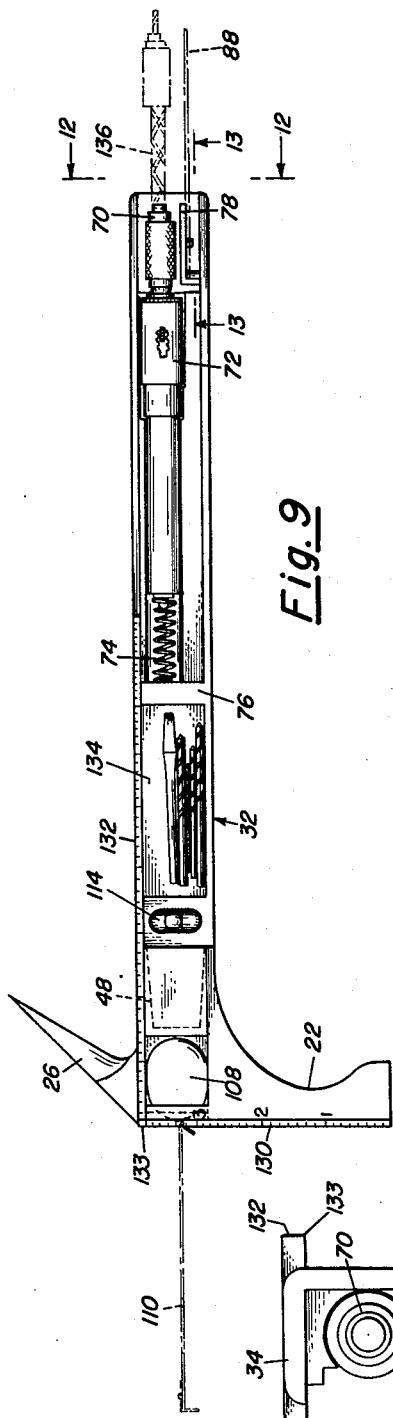

3,119,424
UTILITY TOOL FOR CARPENTER
John C. Henry, 964 Archer St., San Diego 9, Calif.
Filed Jan. 17, 1961, Ser. No. 83,266
3 Claims. (Cl. 145—64)

The present invention relates to a carpenter's utility tool comprising in the main a hammer, the handle of which is hollow for storing carpenter's tools such as drills, bilts, awls, screw driver bits, screw driver, tape type scale, pencils, spirit level, etc.

The handle of the tool of the present invention includes a main body which is generally U-shaped in cross-section and the outer ends of the legs of the U-shaped body are bridged by an elongated cover. Thus the handle provides a storage section or sections. The head end of the main body of the handle and the head end of the cover are provided with complementing hook sections for retaining the head end of the cover in position. The tail end of the cover is provided with a transversely extending portion which extends over the tail end of the main body of the handle. This transversely extending portion of the cover is provided with a shoulder which is adapted to cooperate with a tool in the tail end of the handle for holding the tail end of the cover in position.

Other features and advantages will be apparent from the following description, reference being had to the accompanying drawings wherein a preferred embodiment of the invention is illustrated.

In the drawings:

FIG. 1 is the left side view of the improved tool;

FIG. 2 is an end view looking in the direction of arrows 2—2 of FIG. 1;

FIG. 3 is a top plan view of the tool;

FIG. 4 is a left side view of the head end of the tool with the cover removed;

FIG. 5 is an end view looking in the direction of arrows 5—5 of FIG. 1;

FIG. 6 is a sectional view looking in the direction of arrows 6—6 of FIG. 1;

FIG. 7 is a sectional view looking in the direction of arrows 7—7 of FIG. 4;

FIG. 8 is a fragmentary sectional view looking in the direction of arrows 8—8 of FIG. 4;

FIG. 9 is a view similar to FIG. 1 but showing the cover removed;

FIG. 10 is a left side view of the main body of the handle showing the cover removed;

FIG. 11 is a left side view of the cover;

FIG. 12 is an end view looking in the direction of arrows 12—12 of FIG. 9 with the cover removed;

FIG. 13 is a fragmentary sectional view on a larger scale taken along line 13—13 of FIG. 9 and showing a saw blade in phantom;

FIG. 14 is an upper view of the cover looking in the direction of arrows 14—14 of FIG. 11; and FIG. 15 is a fragmentary sectional view of a head end of the cover.

Referring more in detail to the drawings, the tool is shown in the form of a hammer 20, including a head 22, forming a hammerhead 24 and a claw 26 and including the tines 28. The hammer 20 also includes a handle 30 including an elongated main body 32 which is generally U-shaped in transverse cross-section throughout a substantial portion thereof, one of the legs being shown at 34, forming the top of the handle; another leg is shown at 36 forming the bottom of the handle and the yoke 38 forming the right side of the handle. Other portions of the main body are provided with a left side wall 40 where the section is taken along line 7—7 and shown in FIG. 7. The handle also includes a cover 42 which forms substantially the entire left side of the handle.

The head 22 of the hammer is preferably formed of metal and is provided with a socket 44 which is open at the rear as at 46 for receiving the head end 48 of the main body 32. These parts are secured with one another in any suitable manner.

As will be seen, particularly in FIG. 8, the head 22 is provided with a rearwardly extending portion 50 which merges with an inwardly extending portion 52 to form a hook, and as is seen in FIGS. 8 and 15, the head end of the cover 42 is provided with an inwardly extending portion 54 which merges into a forwardly extending portion 56 which in turn merges into an outwardly merging portion 58 to form a groove between the confronting portions 54 and 58. This groove is indicated at 60 and is hooked about the portion 52 of the hammerhead.

As is seen more clearly in FIGS. 5, 11 and 14, the tail end of the cover 42 is provided with a transversely extending portion 62 which extends over the end 64 of the main body 32. This transversely extending portion 62 is provided with an opening 66 whose walls provide a shoulder 68. One of the tools being housed is provided with a portion 70 which extends into the opening 66, said portion 70 being adapted to engage the wall 68 of the opening 66 to prevent the accidental displacement of the tool end of the cover 42. Preferably this tool comprises a "Yankee" screwdriver whose clutch end forms the portion 70. This screwdriver is shown at 72 and is yieldingly urged outwardly in a coil spring 74 interposed between the end of the screwdriver and transverse wall 76 in the main body handle 32.

To remove the cover, it is necessary only to push the screwdriver rearwardly until the portion 70 is disposed inwardly of the tail wall 62. Then the tail end of the cover can be moved outwardly away from the main body, and after this is done, the hooked portion at the head end of the cover can be detached from the portion 52 of the hammerhead.

As will be seen more clearly from FIGS. 9 and 10, the tail end of the main body 32 is provided with a wall 78 which is interposed between the legs 34 and 36 of said main body and extends longitudinally of the main body. This wall is provided with an outwardly extending button 80. Wall 78 merges at the forward end into a transverse portion 82 which forms a transverse semi-cylindrical boss 84 between the wall 78 and the legs 36 as is more clearly shown in FIG. 13. The tail end of the cover 42 is provided with a longitudinally extending wall 86 which, when in position, is interposed between the outer end of the button 80 and the inner wall of the leg 36. Any suitable tool may be held in position between the wall 78 and the inner wall of the leg 36 and through the button 80 and boss 84. The tool is herein shown in phantom in FIG. 13 as a saw blade 88 having an opening 90 which receives the button 80 and the extreme left end thereof is provided with a notch 92 which receives the boss 84. To attach the part 88, cover 42 is removed and then the saw blade is placed in position with respect to the button 80 and boss 84. Then the cover is replaced and when this is done the wall 86 thereof will be inserted between the left side of the saw blade and the inner wall of the leg 36 which will prevent displacement of the saw. The transverse end wall 62 is provided with a slot 94 for receiving the saw blade. It will, of course, be understood that when the cover is replaced the portion 70 of the tool 72 will prevent displacement of the cover.

In the preferred embodiment, the head 22 of the hammer is provided with a compartment 96 defined by the extreme forward end 98 of the head, and rearwardly extending wall 100, side walls 102 and 104 and the rear wall 106 which forms the forward wall of the socket 46. This compartment 96 is normally covered by the cover 42, as is more clearly shown in FIG. 8. This compartment houses a tape type retractable scale 108 in which the tape 110 is adapted to extend through an opening 112 in the wall 98.

As will be seen more clearly in FIG. 6, the main handle body 32 carries a spirit level 114 which can be viewed from either side of the handle through the openings 116 and 118. The cover 42 is provided with an opening 120 which is aligned with the opening 116 whereby the spirit level can be viewed when the cover is in position. Suitable shock-absorbing material 122 carries the spirit level.

The legs 34 of the main handle body 32 is provided with a groove 124 in the upper side thereof for receiving a pencil 126 which is held in position by resilient clips 128.

This tool also functions as a square in that it is provided with straight edges 130 and 132 on the head and handle respectively. These straight edges are provided with indicia in the form of inches and fractions thereof whereby the straight edges also function as scales. Referring now specifically to FIGS. 2 and 3, it will be observed that these straight edges 130 taper inwardly from the hammer head 24 toward the claw 26, and the straight edges 132 taper inwardly forwardly toward the end of the hammer. Knobs or bosses 133 are disposed on opposite sides of the hammer at the junction of the respective straight edges of the straight edges 130 and 132. The outer ends of the knobs span a width equal to the width between the outer lowermost edges of the straight edges 130, as viewed in FIG. 2 and the width between the outer rearmost edges of the straight edges 132, as viewed in FIG. 3. Thus when the straight edges are used as such, two point suspension is provided, namely either by the lower end of a straight edge 130, as viewed in FIG. 2 and a knob 133, or by the rear end of a straight edge 132, as viewed in FIG. 3, and a knob 133. In this manner there is a gap between the extreme edges of the straight edge so as to provide a clearance for, for example, sawdust or other debris, usually encountered by carpenters.

As will be seen more clearly from FIG. 9, the main handle body 32 forms a compartment 134 for housing tools such as screwdriver, bits and drill bits. This housing 134 is also covered by the cover 42.

Referring again to FIGS. 4 and 14, it will be seen that the opening 66, in the tail portion 62 of the cover 42, merges into a slot 134 of smaller width than the diameter of the opening 66. When it is desirable to use the screwdriver, the tail portion 62 of the cover is moved from its covering position, as previously described. This permits the rear end of the screwdriver to be extended rearwardly. The tail portion 62 is then again moved into position, the slot 134 being of sufficient width to span the spirally threaded portion 136 of the screwdriver.

Thus it is apparent from the foregoing that I have provided a utility tool, particularly useful to non-professional carpenters. Preferably the main body of the handle and the cover are formed of light weight metal.

While the form of embodiment herein shown and described constitutes a preferred form, it is to be understood that other forms may be adopted falling within the scope of the claims that follow.

I claim:

1. In combination, a hammer handle having a head end and a tail end, said handle including a main elongated body substantially U-shaped in transverse cross-section and including an elongated cover bridging the ends of the legs of the U-shaped main body, said body having complementary hook portions adjacent the head end for interlocking the cover with the main body at the head end of the handle, said cover having a transversely extending portion at the tail end of the handle extending over the tail end of the main body, said transversely extending portion of the handle cover having a shoulder; and a tool within the said tail end of the main body and cooperating with the shoulder for retaining said tail end of the handle cover in position.

2. A combination as defined in claim 1, in which the shoulder is formed by a wall of an opening in the transverse portion of the cover and the tool includes a portion extending through said opening and engaging said wall.

3. A combination as defined in claim 1, in which the shoulder is formed by a wall about an opening in the transverse portion of the cover and the tool includes a portion extending into the opening and another portion abutting the shoulder, together with a slot merging with the opening, of narrower width than the opening and extending to an edge of the transverse portion.

References Cited in the file of this patent

UNITED STATES PATENTS

| 1,109,507 | Bostock | Sept. 1, 1914 |
| 1,417,725 | Fullenwider | May 30, 1922 |
| 1,455,822 | Voinov | May 22, 1923 |

FOREIGN PATENTS

| 8,579 | Great Britain | of 1888 |